June 2, 1936.　　　　M. F. KETAY　　　　2,043,000

SIGNAL CONTROL APPARATUS

Filed July 9, 1932　　　2 Sheets-Sheet 1

INVENTOR
MORRIS F. KETAY.

BY Stephen Cerstvik.
ATTORNEY

June 2, 1936.  M. F. KETAY  2,043,000

SIGNAL CONTROL APPARATUS

Filed July 9, 1932  2 Sheets-Sheet 2

INVENTOR
MORRIS F. KETAY.
BY Stephen Gerstvik.
ATTORNEY.

Patented June 2, 1936

2,043,000

UNITED STATES PATENT OFFICE 2,043,000

SIGNAL CONTROL APPARATUS

Morris F. Ketay, Brooklyn, N. Y., assignor to Bendix Aviation Corporation, South Bend, Ind., a corporation of Delaware Application July 9, 1932, Serial No. 621,709

2 Claims. (Cl. 177—311)

This invention relates to signaling apparatus, and more particularly to an electric signal control panel for supervising electrically operated apparatus.

One of the objects of the present invention is to provide a novel tell-tale panel for indicating by means of either visual or audible signals or both a failure of power in an electric circuit such as, for example, a light circuit or a circuit for operating a motor at a remote station.

Another object is to provide in a control apparatus for a running light system including a plurality of control panels, novel means whereby said panels may be electrically connected by merely securing them adjacent each other, thus eliminating binding post connections and wiring therebetween and making it possible to increase or decrease the number of panels with utmost ease and facility.

Another object of the invention is to provide a control panel employing novel signaling means, thereby making it possible to construct a smaller, less expensive unit and at the same time to increase the efficiency thereof.

Still another object is to provide a novelly constructed electric signal control panel which has no charged parts on the face thereof thus minimizing the danger to personnel and eliminating the necessity for a cabinet.

A further object is to provide a novel electric signal circuit and mounting therefor for supervising electrical apparatus.

The above and further objects and novel features of the invention will more fully appear from the following detail description when taken in connection with the accompanying drawings. It is to be expressly understood, however, that the drawings are for the purpose of illustration only and are not designed as a definition of the limits of the invention, reference being primarily had to the appended claims for this purpose.

In the drawings wherein like reference characters refer to like parts throughout the several views.

A novel control panel comprehended by this invention has been illustrated, by way of example, in the form of a panel for independently or collectively controlling the running lights of a marine vessel. A service and a reserve bulb are required in each of these lanterns or "lights" and a novel electrical circuit has been provided for controlling and supervising each of said bulbs from a single unit in said panel.

Figure 1:
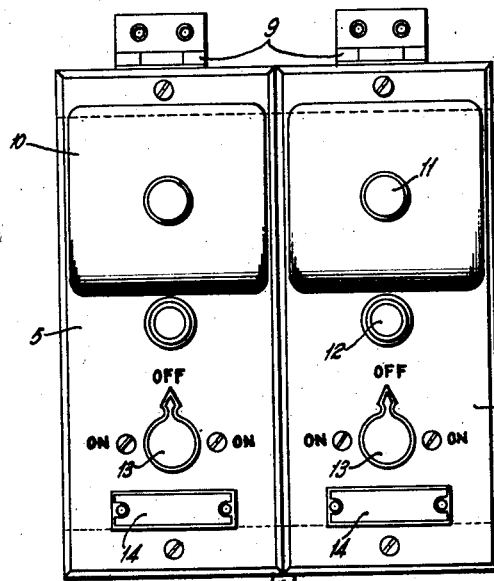
Fig. 1 is a front elevation of a control panel embodying the present invention.
Figure 2:
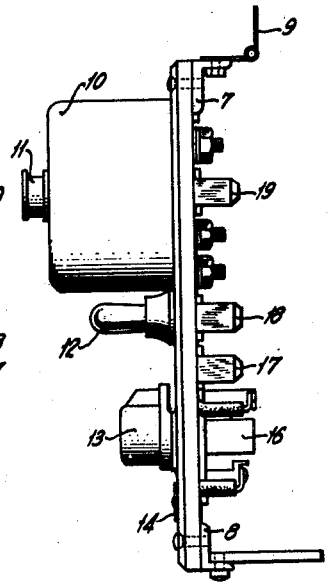
Fig. 2 is a side elevation of the same.

A complete supervisory and signal unit or main panel for one lantern is illustrated in Figs. 1 and 2 as comprising a master panel 5 and a station or line panel 6. An additional line panel may be readily added to the system for each lantern or station to be supervised as will hereinafter appear, while one master panel will serve any desired number of line panels. Each panel is adapted to be mounted on a suitable frame by means of angle bars 7 and 8 which are riveted or otherwise suitably attached to the upper and lower edges of said panels. If desired, a hinge 9 may be secured to angle 7 for conveniently mounting said panel.

It is desirable that electrical apparatus such as is disclosed herein have no "live" or charged elements exposed on the face thereof for reasons, the chief of which is personnel safety. In the present construction, this feature is accomplished while at the same time the necessity for a cabinet is obviated. Normally, there appears on the face of each line panel a readily removable moulded cover 10 secured thereon by means of a thumb nut 11, a visual signal 12, a switch key 13, and a name plate 14 for indicating the station controlled by that particular panel. The face of the master panel is identical with that of the line panels except that no visual signal is provided.

Novel signaling means for apparatus of this character are provided in the form of a neon lamp 12. The latter is readily visible but yet does not have the undesirable glare of a hot filament lamp. Since the current consumption of a neon lamp is less than that of a hot filament lamp, smaller and less expensive wiring and switches may be used.

Figure 4:
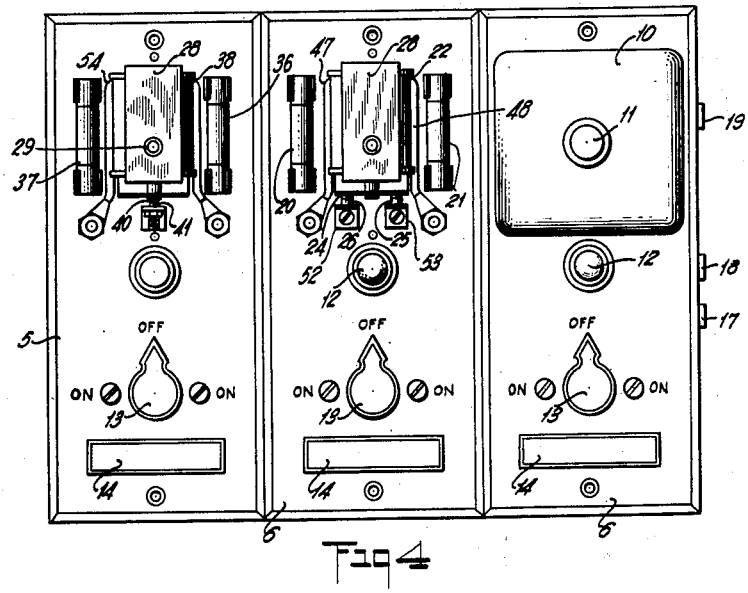
Fig. 4 is a front elevation of a multiple unit panel with certain parts removed.
Figure 5:
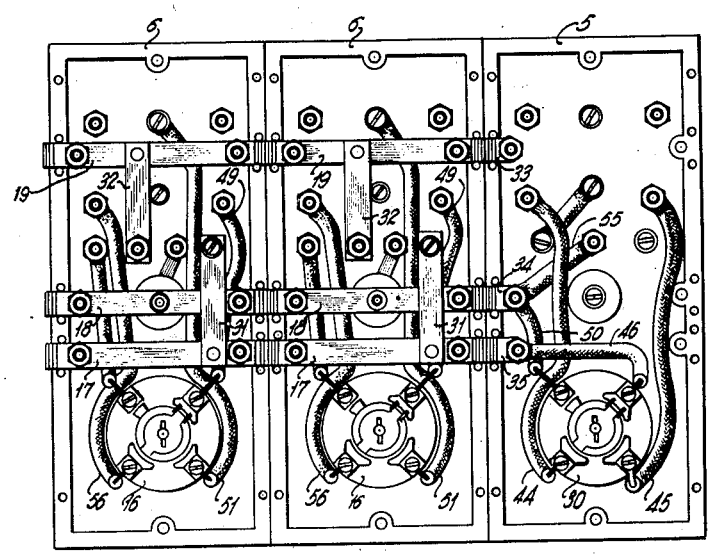
Fig. 5 is a rear elevation of the parts shown in Fig. 4.

Referring particularly to Figs. 4 and 5, each line panel, as shown, has mounted thereon, in addition to the above enumerated parts, a selector switch 16 having four contacts 1, 2, 3, and 4, U-shaped bus bars 17, 18 and 19 mounted in such a manner that the curved end portions thereof slidably contact like bus bars on adjacent panels, a pair of overload fuses 20, 21 and a solenoid type double pole, single throw relay. The latter is mounted under cover 10 and consists of a coil 22, a solenoid plunger 23 movable therein and a contact arm 24 carried by said plunger. When coil 22 is de-energized, contact arm 24 is adapted to complete two circuits through a pair of contacts 25 and 26. The above-described relay unit is mounted on a frame 28 (Fig. 4) which in turn supports cover 10 by means of a pin 29 and thumb nut 11. Bus bars 17 and 19 may have riveted thereto vertical contact bars 31 and 32, respectively.

The master panel to which the supply line leads are taken is provided with a double pole, single throw switch 30 having four contacts a, b, c and d (Fig. 3), contact bars 33, 34 and 35 mounted near the edge thereof, which are curved for contacting the bus bars 19, 18 and 17, respectively, of an adjacent line panel, fuses 36, 37, and a solenoid type buzzer. The latter, mounted similarly to solenoid 22, comprises a coil 38, a solenoid plunger 39 and buzzer contacts 40, 41.

Figure 3:
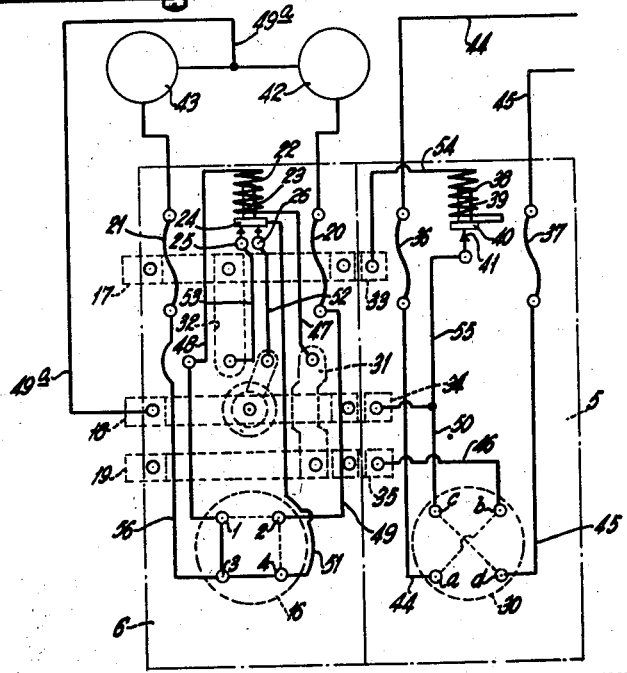
Fig. 3 is a diagrammatic view showing an electrical hookup for the panels illustrated in Fig. 1.

A novel electric circuit including the above apparatus is provided for controlling a service and a reserve electrical device from each line panel, such as, for example, service bulb 42 and reserve bulb 43 of a navigational light shown diagrammatically in Fig. 3. In the illustrated form, such circuit is constituted by main supply lines 44 and 45 which lead through fuses 36, 37, to contacts a and d of switch 30. All of the panels are connected in series with said main supply lines by means of bus bars 18 and 17 while the circuits on and leading from each line panel and including all of the above-described apparatus are in parallel across said lines.

In the normal operation of the small unit shown in Fig. 1, key 13 of switch 16 is thrown to the right hand "on" position whereby contacts 1, 2 and 4 of said switch are electrically connected in series. Switch 30 is also turned to "on" position. Current then flows from an electric source (not shown) through line 44, switch contacts a and b, lead 46, contact 35, bus bar 17, contact bar 31, lead 47, coil 22, lead 48, switch contacts 1 and 2, lead 49 including fuse 20, service bulb 42, lead 49a, bus bar 18, contact 34, lead 50, switch contacts c and d and line 45 back to source. Service bulb 42 is thus lighted and coil 22 is energized for opening contacts 25 and 26 by attracting plunger 23.

If bulb 42 should burn out or its circuit be otherwise broken, coil 22 would become de-energized and solenoid plunger 23 would fall out closing contacts 25 and 26. As soon as this happens, current flows in the same path as described above as far as switch 16 and thence through lead 51, contact arm 24, contact 26, lead 52, neon lamp 12, bus bar 18, contact 34, lead 50 to line 45 back to source thus lighting neon lamp 12 as an indicator that light 42 is no longer burning. A second circuit is also closed from contact arm 24 through contact 25, lead 53, bar 32, bus bar 19, contact 33, lead 54, coil 38, buzzer contacts 40, 41, leads 55, 56, contacts c, d and line 45 to source. As soon as coil 38 is thus energized, plunger 39 is attracted upwardly opening contacts 40, 41. The circuit to coil 38 is thus broken and plunger 39 falls out to again close contacts 40, 41. This cycle of events is very rapid and an audible buzzer signal results. During the operation of lamp 12 and the buzzer, the flow of current through coil 22 is not large enough to sufficiently energize the same for lifting plunger 23.

In order to turn on the reserve light 43 and cut out both of the above signals, it is only necessary to turn switch 16 to the left hand "on" position thus connecting contacts 1, 3 and 4 in series. A circuit is then closed through the original circuit to switch 16 and thence from contact 3 through lead 56, light 43, lead 49a, bus 18, lead 50, switch 30 and line 45 back to source. Light 43 is thus lighted and enough current flows through coil 22 to sufficiently energize the same for raising plunger 23 to open contacts 25 and 26, thereby opening the circuits to lamp 12 and buzzer coil 38.

If it is desired to control more than one set of lights or stations, a line panel identical with the one described above is added to the system for each additional station. When inserting a new line panel, it is only necessary to attach the same to angle bars 7 and 8 (Fig. 2) adjacent to the panel last installed and make the necessary connections from the new station.

Since the construction is such as affords the use of a series of panels, for esthetic reasons the master panel may be made to appear similar to the individual light panels. The rotary switches employed permit such similarity despite the differences in the electrical circuits made and broken thereby. For example, the master switch to conform with the line switches may have two "on" positions and an intermediate "off" position, the rotor of the switch, as diagrammatically illustrated having a pair of diagonal connectors which make the circuits at positions substantially 90° apart.

There is thus provided an electric signal control panel employing novel means for controlling an electric circuit wherein an audible trouble signal common to all stations and a visual signal for each particular station are provided for indicating a failure of power to any of said stations. The novel control panel provided is economical and inexpensive as well as efficient and is well adapted for practical use. The latter is so constructed that the parts thereof are readily accessible and yet no live or charged parts are exposed on the face of the panel. Although only one embodiment of the invention has been shown and described, it is to be expressly understood that various changes may be made in the details and arrangement of parts illustrated without departing from the spirit of the invention. Reference will primarily be had, therefore, to the appended claims for a definition of the limits of the invention.

What is claimed is:

1. In a running light control circuit containing two lamps either of which may be lighted at will and upon a failure thereof an automatic warning signal rendered, a switch having four contacts with means for bridging any three contacts at a time, one of said contacts being connected to a source of electrical energy through a relay coil, another two of said contacts being connected to one side of each of a pair of lamps, said lamps being connected together on their other side and to the source of energy, and the fourth contact being connected in a circuit including an indicator to the common connection between said lamps, said circuit being normally broken by energization of said relay coil.

2. In a running light control circuit containing two lamps either of which may be lighted at will and upon a failure thereof an automatic warning signal rendered, a switch having four contacts with means for bridging any three contacts at a time, one of said contacts being connected to a source of electrical energy through a relay coil, another two of said contacts being connected to one side of each of a pair of lamps, said lamps being connected together on their other side and to the source of energy, and the fourth contact being connected in a circuit including a high resistance low current indicator to the common connection between said lamps, said circuit being normally broken by energization of said relay coil.

MORRIS F. KETAY.